United States Patent

(12) United States Patent
Soluk et al.

(10) Patent No.: US 7,620,704 B2
(45) Date of Patent: *Nov. 17, 2009

US007620704B2

(54) METHOD AND APPARATUS FOR CONFIGURING A SERVER

(75) Inventors: Kirk Soluk, Bellevue, WA (US); Everett McKay, Redmond, WA (US); Hitesh Raigandhi, Redmond, WA (US); Yang Gao, Issaquah, WA (US); Praerit Garg, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1155 days.

This patent is subject to a terminal disclaimer.

(21) Appl. No.: 10/611,372

(22) Filed: Jun. 30, 2003

(65) Prior Publication Data

US 2006/0168152 A1 Jul. 27, 2006

(51) Int. Cl.
*G06F 15/177* (2006.01)

(52) U.S. Cl. .................................................... 709/220

(58) Field of Classification Search ......... 709/229–230, 709/216–225, 203–205
See application file for complete search history.

(56) References Cited

U.S. PATENT DOCUMENTS

| | | | | |
|---|---|---|---|---|
| 5,596,723 | A * | 1/1997 | Romohr | 709/222 |
| 5,819,030 | A | 10/1998 | Chen et al. | |
| 6,212,558 | B1 * | 4/2001 | Antur et al. | 709/221 |
| 6,308,188 | B1 | 10/2001 | Bernardo et al. | |
| 6,339,750 | B1 * | 1/2002 | Hoyer et al. | 702/182 |
| 6,434,607 | B1 | 8/2002 | Haverstock et al. | |
| 6,466,972 | B1 | 10/2002 | Paul et al. | |
| 6,493,752 | B1 * | 12/2002 | Lee et al. | 709/223 |
| 6,567,849 | B2 | 5/2003 | Ludovici et al. | |
| 6,711,686 | B1 * | 3/2004 | Barrett | 709/221 |
| 6,760,324 | B1 * | 7/2004 | Scott et al. | 370/352 |
| 6,877,093 | B1 * | 4/2005 | Desai et al. | 713/156 |
| 6,993,562 | B2 * | 1/2006 | Treptow et al. | 709/206 |
| 7,085,824 | B2 * | 8/2006 | Forth et al. | 709/221 |
| 7,093,005 | B2 * | 8/2006 | Patterson | 709/220 |
| 7,103,647 | B2 * | 9/2006 | Aziz | 709/220 |
| 7,159,183 | B1 * | 1/2007 | Kudukoli et al. | 715/762 |
| 2002/0002611 | A1 | 1/2002 | Vange | |
| 2002/0052941 | A1 * | 5/2002 | Patterson | 709/223 |
| 2002/0158907 | A1 * | 10/2002 | Yamamura | 345/765 |
| 2002/0161674 | A1 | 10/2002 | Scheer | |
| 2002/0161874 | A1 * | 10/2002 | McGuire | 709/223 |
| 2003/0050998 | A1 | 3/2003 | Garnett et al. | |
| 2003/0108018 | A1 | 6/2003 | Dujardin et al. | |
| 2003/0131078 | A1 * | 7/2003 | Scheer et al. | 709/220 |
| 2003/0233431 | A1 * | 12/2003 | Reddy et al. | 709/221 |
| 2004/0010574 | A1 * | 1/2004 | Cammick et al. | 709/222 |
| 2004/0010575 | A1 | 1/2004 | Wookey et al. | |
| 2004/0031058 | A1 | 2/2004 | Reisman | |
| 2004/0034577 | A1 * | 2/2004 | Van Hoose et al. | 705/28 |

OTHER PUBLICATIONS

Kyung et al., "An Agent-Manger Scheme for the Intergrated Transport Network Management", 1999, IEEE, 1017-1021.

(Continued)

*Primary Examiner*—Yasin M Barqadle
(74) *Attorney, Agent, or Firm*—Lee & Hayes, PLLC

(57) ABSTRACT

A process identifies one or more roles associated with a target server. The process also identifies one or more services associated with each role and identifies one or more ports associated with each role. The identified ports associated with the role are presented to a user. The user is requested to select among the identified ports associated with the role.

33 Claims, 12 Drawing Sheets

OTHER PUBLICATIONS

Gurgens, et al.; "Role based spedification and security analysis of cryptographic protocols using asynchronous product automata"; PRoceedings of the 13th International Workshop on Database and Expert Systems Applications (DEXA'02); 1529-4188/02 IEEE; Computer Science Society, 7 pages, 2002.

Noel, Jasmine; "New Roles Taking Shape in Enterprise IT Infrastructure"; A sponsored Supplement to Software Magazine; Summer Edition, vol. 22,. No. 2, pp. 25-32, 2002.

Raynal, F.; "Bastille Linux"; Multi-System & Internet Security Cookbook (Misc); 2000; www.security-labs.org.; 12 pages.

* cited by examiner

300

```
- <SCWKnowledgeBase schemaLocation="W2k3.xsd">
  - <Roles>
      ...
    - <Role Type="Server">
        <Name>WEB</Name>
      - <Selected>
          <Maximum Value="FALSE" />
          <Typical Value="CUSTOM" FunctionName=
            "SvcapisServingWebPages" DLLName="scwhlp.dll" />
        </Selected>
    - <Services>
      - <Service>
          <Name>IISAdmin</Name>
        </Service>
    - <Service>
          <Name>HTTPFilter</Name>
        </Service>
    - <Service>
        <Name>W3SVC</Name>
      </Service>
    </Services>
  - <Ports>
    - <Port>
        <Name>HTTP</Name>
        <Type>Inbound</Type>
      </Port>
  - <Port>
        <Name>HTTPS</Name>
        <Type>Inbound</Type>
      </Port>
    </Ports>
  </Role>
</Roles>
```

```
- <Ports>
   ...
  - <Port>
      <Name>HTTP</Name>
      <Number>80</Number>
  - <Protocols>
    - <Protocol>
        <Name>TCP</Name>
      </Protocol>
    </Protocols>
  </Port>
- <Port>
      <Name>HTTPS</Name>
      <Number>443</Number>
  - <Protocols>
    - <Protocol>
        <Name>TCP</Name>
      </Protocol>
    </Protocols>
  </Port>
 </Ports>
</SCWKnowledgeBase>
```

```
- <Role Type="Server" SourceKB="W2k3.xml">
    <Name>WEB</Name>
    <Satisfiable>FALSE</Satisfiable>
    <Selected>FALSE</Selected>
  - <Services>
    - <Service>
        <Name>IISAdmin</Name>
      </Service>
    - <Service>
        <Name>HTTPFilter</Name>
      </Service>
    - <Service>
        <Name>W3SVC</Name>
      </Service>
    </Services>
  - <Ports>
    - <Port>
        <Name>HTTP</Name>
        <Type>Inbound</Type>
      </Port>
    - <Port>
        <Name>HTTPS</Name>
        <Type>Inbound</Type>
      </Port>
    </Ports>
  </Role>
```

```
- <SecurityPolicy>
  - <Extension ID="{A1D76559-8DB5-3F05-9821-
    B495A565076C}"  Name="SCE">
      <Service Name="Alerter" StartupMode="Disabled" />
      <Service Name="browser" StartupMode="Disabled" />
      <Service Name="ComSysApp" StartupMode="Manual" />
      <Service Name="CryptSvc" StartupMode="Automatic" />
      <Service Name="EventLog" StartupMode="Automatic" />
      <Service Name="ProtectedStorage" StartupMode=
         "Automatic" />
      <Service Name="uploadmgr" StartupMode="Disabled" />
      ...
    </Extension>
- <Extension ID="{78A2BE03-EFE1-4695-96B8-33C477241BC9}"
  Name="IPSec">
  - <Filters Type="Destination">
    - <Interface>
        <IPAddress>157.59.132.0</IPAddress>
        <SubnetMask>255.255.252.0</SubnetMask>
    - <PortExemptions>
      - <Port>
          <Number>80</Number>
          <Type>Inbound</Type>
      - <Protocols>
          <Protocol>TCP</Protocol>
        </Protocols>
      </Port>
    - <Port>
        <Number>443</Number>
        <Type>Inbound</Type>
    - <Protocols>
        <Protocol>TCP</Protocol>
      </Protocols>
     </Port>
    </PortExemptions>
   </Interface>
  </Filters>
  <Permitted />
  <Trusted />
- <DynamicExemptions>
    <Type>SUS</Type>
  </DynamicExemptions>
```

```
  - <ProtocolExemptions>
      <Type>ICMP</Type>
    </ProtocolExemptions>
  - <Security>
    - <Authentication>
        <Kerberos>Yes</Kerberos>
      </Authentication>
    </Security>
  </Extension>
- <PolicyAuthoringData>
  - <Extension ID="{43F65325-1C59-4748-A455-
    81F4146B209F}" Name="SCW">
      <PrototypeMachine Name="TEST" />
    - <Selection>
      - <Roles>
        - <Role>
            <Name>File</Name>
          </Role>
        - <Role>
            <Name>WEB</Name>
          </Role>
        - <Role>
            <Name>WindowsUpdate</Name>
          </Role>
        </Roles>
      - <Tasks>
        - <Task>
            <Name>Backup</Name>
          </Task>
        - <Task>
            <Name>ErrorReporting</Name>
          </Task>
        - <Task>
            <Name>RemotePrinting</Name>
          </Task>
        </Tasks>
      </Selection>
    </Extension>
  </PolicyAuthoringData>
</SecurityPolicy>
```

Fig. 9B

METHOD AND APPARATUS FOR CONFIGURING A SERVER

TECHNICAL FIELD

The systems and methods described herein relate to assisting a user in configuring one or more servers based, in part, on a user's response to various requests.

BACKGROUND

Different types of servers are used to perform a variety of tasks in, for example, a network environment. Example servers include file servers, print servers and web servers. A file server is a computing device and a storage device that stores files. Users on a network can store files to the file server and retrieve files from the file server. A print server is a computing device that manages one or more printers coupled to the print server or coupled to a common network. A web server is a computing device coupled to a network (such as the Internet) that delivers (i.e., serves up) web pages. A web server has an IP address and, in some cases, a domain name. Servers are often dedicated such that they do not perform other tasks outside their server tasks. Certain servers may be capable of performing multiple tasks or functioning as multiple servers simultaneously (such as a file server and a print server).

Initially, a server needs to be configured to perform the various functions desired by a network administrator or other operator. Configuration of the server may also define certain operating characteristics, such as what types of users can access the server, how the server handles various types of requests, and what types of data should be encrypted by the server.

In existing systems, network administrators or other operators are responsible for configuring servers. Often, this configuration requires a significant amount of understanding and low-level control of the various operating characteristics. These manual tasks are time-consuming and may be redundant if the network administrator is configuring multiple servers that perform similar functions. In these situations, the "quality" of the server configuration is dependent on the knowledge and skill of the network administrator. If the network administrator is inexperienced at configuring servers, the server may not be configured in the best possible manner. Improper or inefficient server configuration may cause problems, such as poor server performance or inadequate server security.

Accordingly, there is a need for improved techniques for configuring one or more servers.

SUMMARY

The systems and methods described herein configure a target server based on knowledge of roles to be performed by the target server and based on a user's response to various questions regarding the target server. In one embodiment, a process identifies a role associated with a target server. The process then identifies one or more services associated with the role and identifies one or more ports associated with the role. The identified services and ports associated with the role are presented to a user, who is requested to select among the identified ports associated with the role.

BRIEF DESCRIPTION OF THE DRAWINGS

Similar reference numbers are used throughout the figures to reference like components and/or features.

FIGS. 3A and 3B illustrate data contained in a portion of an example knowledge base.

FIG. 5 illustrates an example of a Runtime XML file associated with one or more servers.

FIGS. 9A and 9B illustrate an example of an Output XML file associated with one or more servers.

DETAILED DESCRIPTION

The systems and methods described herein allow an administrator (or other user) to configure one or more servers based on functional and deployment requirements solicited by a user interface. When configuring a target server, the systems and methods described herein access data contained in one or more knowledge bases along with user-supplied input regarding how the target server will be used. The knowledge bases contain information regarding operating system and application parameters that need to be configured or analyzed from a security perspective. Based on information obtained from the knowledge bases, information regarding the target server and one or more roles, identified by a user, the systems and methods present the user with various choices, such as which ports to activate on the target server. These choices are limited to those that are relevant based on the information obtained from the knowledge bases, the information regarding the target server, and the roles identified by the user.

Various examples discussed herein refer to one or more servers. As used herein, a "server" is any computing device capable of performing functions defined by a particular server type. As discussed herein, a computing device may need to be configured to perform one or more roles, such as a file server role. Certain tasks associated with the file server role may include retrieving files, storing files and providing files to requesting devices. In particular embodiments, a "server" may perform multiple roles.

Particular examples discussed herein refer to configuration of a single server. However, the systems and methods discussed herein can be applied to the configuration of any number of servers. For example, if two servers are to be configured in similar ways, the two servers can be configured by creating a transform that can be deployed to configure both servers.

Specific examples discussed herein refer to Extensible Markup Language (XML) files. XML represents one possible language that may be used with the systems and methods discussed herein. In alternate embodiments, any other language or file storage format can be utilized.

As discussed herein, a particular server may be configured to perform one or more roles. A role defines, for example, a set of functions or tasks that the server performs. Example roles include a file server, a print server, a web server, a domain controller, a DNS server, an SMTP server and a terminal server. A file server role, for example, receives files, stores files and responds to file access requests. Various security parameters are associated with the different roles. For example, roles may have associated security parameters relating to account login policies, event log settings, port filtering policies, Internet Protocol Security (IPSec) policies and security-related registry values. Additional details regarding roles are provided below.

Figure 1:
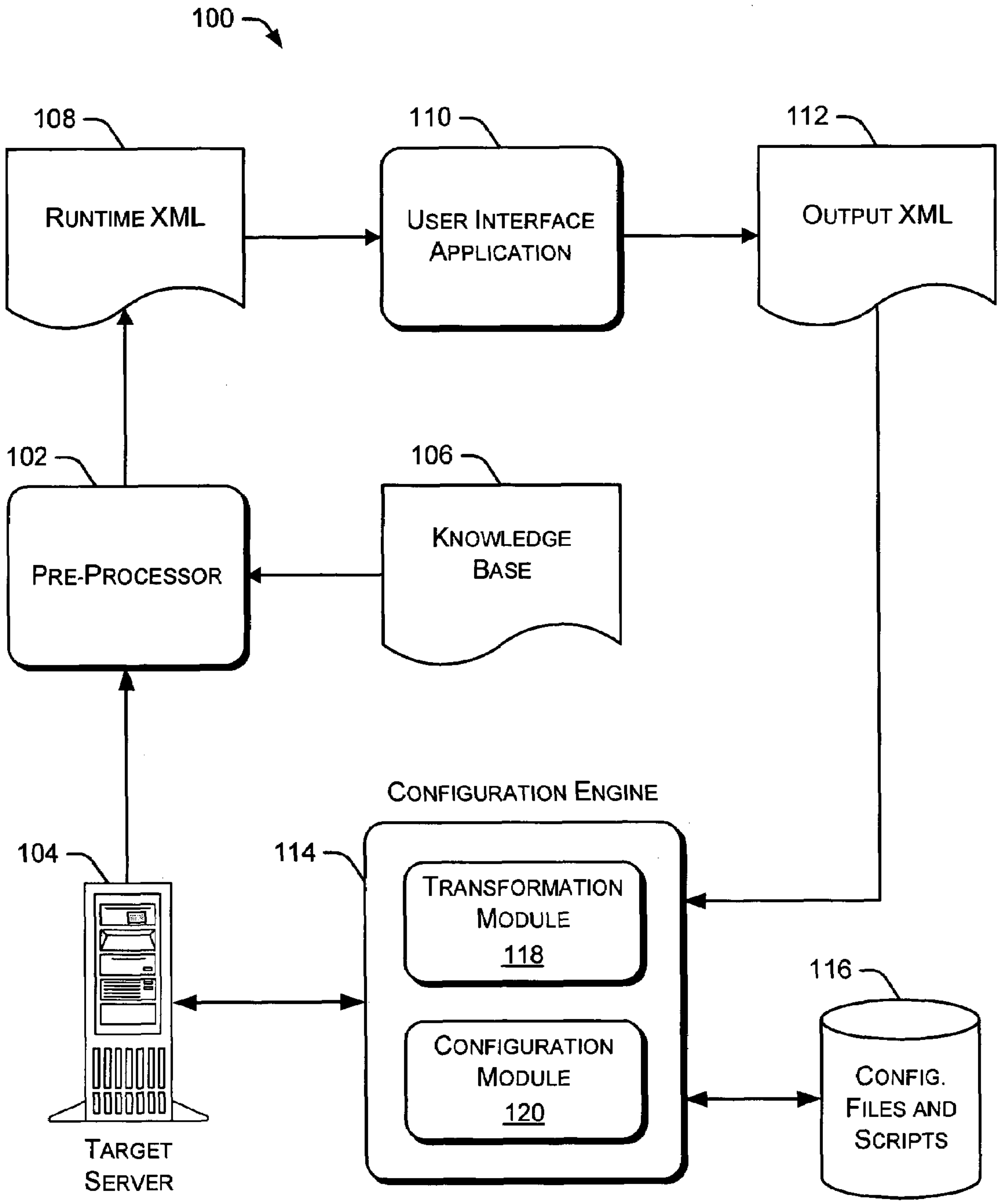
FIG. 1 is a block diagram illustrating an example architecture capable of configuring one or more servers.

FIG. 1 is a block diagram illustrating an example architecture 100 capable of configuring one or more servers. A pre-processor 102 is coupled to a target server 104. Target server 104 is a server being configured or re-configured. Pre-processor 102 obtains information from target server 104, such as how the target server is currently configured, the types of roles that the target server is able to perform, etc. Pre-processor 102 also retrieves information from a knowledge base 106. Knowledge base 106 may also be referred to as an "unprocessed knowledge base". Knowledge base 106 is an Extensible Markup Language (XML) file that identifies operating system and application parameters that need to be configured or analyzed from a security perspective. The information in knowledge base 106 is presented in functional terms that are more easily understood by network administrators who are not necessarily server or security experts. Knowledge base 106 also contains directives utilized by the user interface that help determine the default values rendered by the user interface under various circumstances such as the current configuration of the target server 104 and previous choices made by the user. Additionally, knowledge base 106 defines mappings between abstractions (e.g., roles) defined in the user interface and the underlying settings (e.g., services).

In a particular implementation, target server 104 is not actually configured. Instead, target server 104 is merely used to assist a user in creating a policy for a system similar to the target server. The target server assists the user by causing the filtering out of information in the knowledge base that doesn't apply to the environment for which the user is creating a policy. In an alternative embodiment, a target server is not used to generate a policy. In this embodiment, the user has access to all data in the knowledge base.

Pre-processor 102 creates a run-time specific knowledge base, which is referred to in FIG. 1 as a Runtime XML 108. Runtime XML 108 may also be referred to as a "processed knowledge base". Runtime XML 108 is created by comparing the raw knowledge base data 106 to the current state of target system 104. By pre-processing the knowledge base data 106, a user interface application 110 (which receives Runtime XML 108) is able to render more appropriate information and start with more accurate details. For example, if particular roles cannot be supported by target server 104, Runtime XML 108 can indicate those unavailable roles such that user interface application 110 does not offer those unavailable roles to the network administrator for selection by default. Additionally, pre-processor 102 identifies other information that is not contained in knowledge base 106, such as network configuration information (e.g., network interface controllers and IP addresses on the target server). This information is provided to user interface application 110 and is helpful in providing the correct default choices to a user. For example, if a role is already selected on the target server, the user interface application 110 will present that role as being selected by default.

In a particular embodiment, Runtime XML 108 contains all of the data from knowledge base 106, but the data elements are "tagged" to indicate whether the particular elements (e.g., particular roles) are supported by target server 104. An example tag is: <Satisfiable> TRUE</Satisfiable> In another embodiment, the data elements that are not supported by target server 104 are filtered out by user interface application 110 such that they are not included in Runtime XML 108. This "filtering out" process is accomplished by the tags discussed above. The two tags are <Satisfiable> and <Selected>, which tell the user interface application 110 whether or not the role can be performed by the server. If so, the tags indicate whether or not to select that role by default.

Runtime XML 108 can be stored on a storage device, such as a hard disk drive, for later retrieval by user interface application 110 or other applications. This architecture decouples pre-processor 102 from user interface application 110. This architecture allows for free-form XML based data structures as a way of interacting between the configuration engine and the user interface application.

Runtime XML 108 is provided to user interface application 110, which obtains additional input about the desired configuration of target server 104 from a network administrator or other individual. Using the data in Runtime XML 108, user interface application 110 is able to restrict the options and configuration information requested from the network administrator to those options and configuration information that are relevant to target server 104. For example, if target server 104 is not capable of functioning as a DNS server, then user interface application 110 does not present that option to the network administrator. Although the option is not presented to the network administrator, the role is still available by taking a different "view" of the Runtime XML. Thus, policies can be created without necessarily being connected to the appropriate server. Additionally, if user interface application 110 identifies the operating system (OS) level of target server 104 (e.g., by querying the target server), the knowledge base data can be consulted to determine the set of security levels supported by the system. Thus, user interface application 110 utilizes information from knowledge base 106 and knowledge of the current state of target server 104 to solicit functional server requirements from the network administrator and generate a resulting security policy (shown in FIG. 1 as an Output XML 112). In one embodiment, the user interface application 110 queries the OS version to determine which knowledge base should be used. In this embodiment, there is a primary knowledge base associated with each OS version.

In a particular embodiment, two different security levels are available: Maximum and Typical. These two security levels control how the pre-processor 102 chooses the default settings that are rendered in user interface application 110. For example, if the user chooses "Maximum" security, the pre-processor will generate a Runtime XML that has minimal roles selected.

User interface application 110 also guides the user through the creation of a security policy that will provide appropriate security for a given deployment scenario. Guidance is provided by navigating the user through a series of questions designed to solicit the functional requirements that the server needs to provide. Disabling functionality that is not required enhances security by 1) reducing the amount of potentially problematic code that is running, 2) disabling the usage of insecure legacy protocols, 3) limiting the services exposed to untrusted users, and 4) making appropriate operating system and application configuration settings.

Output XML 112 is provided to a configuration engine 114 that is coupled to target server 104. Output XML 112 may also be referred to as a "security policy". Configuration engine 114 (also referred to as a "back-end engine") provides a framework and a set of components, a transformation module 118 and a configuration module 120, that can transform Output XML 112 generated by user interface application 110 into native scripts and configuration files. These native scripts and configuration files are stored temporarily or permanently on a data storage device 116 coupled to configuration engine 114. The native scripts and configuration files are subsequently applied to target server 104 during a configuration phase. Configuration engine 114 also enables or disables various services, as needed, to implement the roles selected by the user through user interface application 110. Configuration engine 114 also supports rollback and analysis operations in addition to configuration operations. Rollback is a flag that can be passed to a "back-end" transformation or application engine. Rollback is the operation of restoring the system to a previous state. The rollback operation is supported by a "back-end engine" (not shown). A rollback transformation compares the configuration policy to the current state of the system and stores the current values for the changes that would be made if the policy were applied. If desired, these stored current values can subsequently be submitted to the configuration engine to undo a previously applied policy.

Analysis operations determine whether a system is in compliance with a particular policy. For example, if an output policy indicates "disable service x", the analysis operations will generate a warning if service x is enabled. The primary difference between the analysis operations and rollback is their outputs. The rollback output needs to be resubmitted to the configuration engine and the analysis operation output needs to be viewable in a user interface.

Transformation module 118 (in configuration engine 114) transforms the data in Output XML 112 into native scripts and configuration files. Output XML 112 is typically a high-level policy written in XML. Transformation module 118 transforms the high-level policy to native scripts and configuration files that can be understood by target server 104. Configuration module 120 applies one or more policies (defined by native scripts and configuration files) to target server 104, thereby configuring the target server. The transformation performed by transformation module 118 is similar to the compilation function performed by a compiler to convert source code into object code for a particular processor architecture. Output XML 112 is similar to the source code and the resulting native scripts and configuration files are created for a particular architecture (the target server).

In one embodiment, Output XML 112 represents a high-level policy that will be applied to the target server 104. The high-level policy is transformed into a more specific file customized for target server 104. This high-level policy can be applied to multiple different target servers, in which case a separate customized file is created for each target server. Although the high-level policy is the same, the separate customized files may differ due to differences in the target servers.

Although FIG. 1 illustrates a single knowledge base 106, a particular embodiment may include multiple knowledge bases coupled to pre-processor 102. In this embodiment, one knowledge base is the standard knowledge base containing information regarding standard server roles for a particular version of an operating system. Another knowledge base may define roles developed and supported by a third party. For example, a third party may define one or more roles associated with a database server. This use of multiple knowledge bases allows one knowledge base to be updated without affecting the other knowledge bases. Additionally, a user (such as a network administrator) may create their own knowledge base containing one or more role definitions. In one embodiment, these user-created role definitions replace any definitions of roles of the same name in knowledge base 106. In one embodiment, multiple knowledge bases are reconciled together by pre-processor 102 and merged into a single Runtime XML file that is utilized by user interface application 110. Additional information regarding knowledge bases is provided below.

Although particular examples discussed herein refer to a target server, alternate embodiments can configure a server without having any previous knowledge of the server's current configuration or capabilities. In these alternate embodiments, the systems and methods may presume that the server is capable of performing any role.

The systems and methods discussed herein provide for a "policy authoring" process. This process includes a series of XML transforms (e.g., knowledge base to Runtime XML, Runtime XML to Output XML, and so on).

Figure 2:
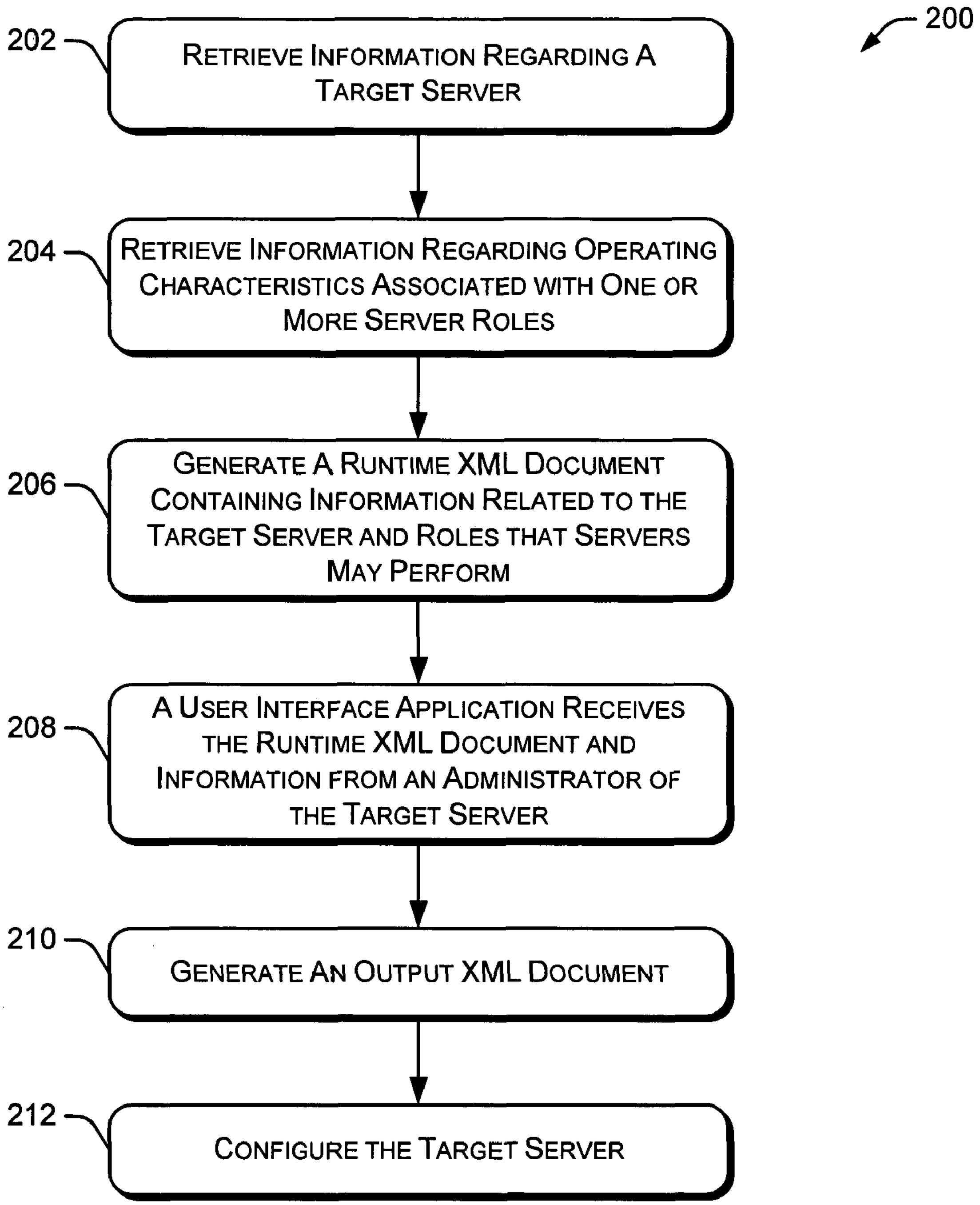
FIG. 2 is a flow diagram illustrating an embodiment of a procedure for configuring a server using the architecture of FIG. 1.

FIG. 2 is a flow diagram illustrating an embodiment of a procedure 200 for configuring a server using the architecture of FIG. 1. Initially, procedure 200 retrieves information regarding a target server (block 202). This information includes, for example, the target server's features, capabilities, and current configuration. The procedure then retrieves information regarding operating characteristics associated with one or more server roles (block 204). These operating characteristics include, for example, services used by various roles, communication ports used by various roles and Internet Information Server (IIS) requirements. The operating characteristics may also include rules for determining whether or not the role is likely being performed by the target server.

Procedure 200 continues by generating a Runtime XML document that contains information related to the target server and various roles that servers may perform (block 206). A user interface application then receives the Runtime XML document and obtains additional information from an administrator of the target server or another person (block 208). The procedure then generates an Output XML document (block 210) that contains the high level security policy for the target server or other similarly configured servers.

FIGS. 3A and 3B illustrate data 300 contained in a portion of an example knowledge base. As shown, various roles, services, ports and protocols are identified and defined. For example, a role named "WEB" has an associated type of "Server". Three different services are identified: "IISAdmin", "HTTPFilter" and "W3SVC". Additionally, two ports are identified: "HTTP" and "HTTPS". The data 300 also identifies a protocol (TCP). The port "HTTPS" has an associated port number of "443" and uses the TCP protocol. The knowledge base data shown in FIGS. 3A and 3B is abbreviated for purposes of explanation. A particular knowledge base may identify and define any number of roles, services, ports, protocols, tasks and other information. A knowledge base entry may also indicate the direction of a required network communication (such as inbound or outbound). For example, a Web Server role requires port 80 to be opened for inbound communication, but a Web Client role would require port 80 to be opened for outbound communication.

Certain services are not conveniently abstracted by roles. Services such as snapshot, UPS, performance monitoring, etc. are independent of the "role" the machine is performing. These services can be abstracted by tasks as shown in the following example:

```
<Task>
  <Name> AppMgmt </Name>
  <DependsOn>
    <Roles>
      <Role>
        <Name> DomainMember </Name>
      </Role>
    </Roles>
  </DependsOn>
  <Satisfiable> TRUE </Satisfiable>
  <Selected> FALSE </Selected>
  <Services>
    <Service>
      <Name> AppMgmt </Name>
    </Service>
  </Services>
  <Ports> TBD
  </Ports>
</Task>
```

The definition of a task has similar syntax to the definition of a role. Additionally, the semantics for the Satisfiable, Selected, Services and Ports elements are the same as they are for roles.

Figure 4:
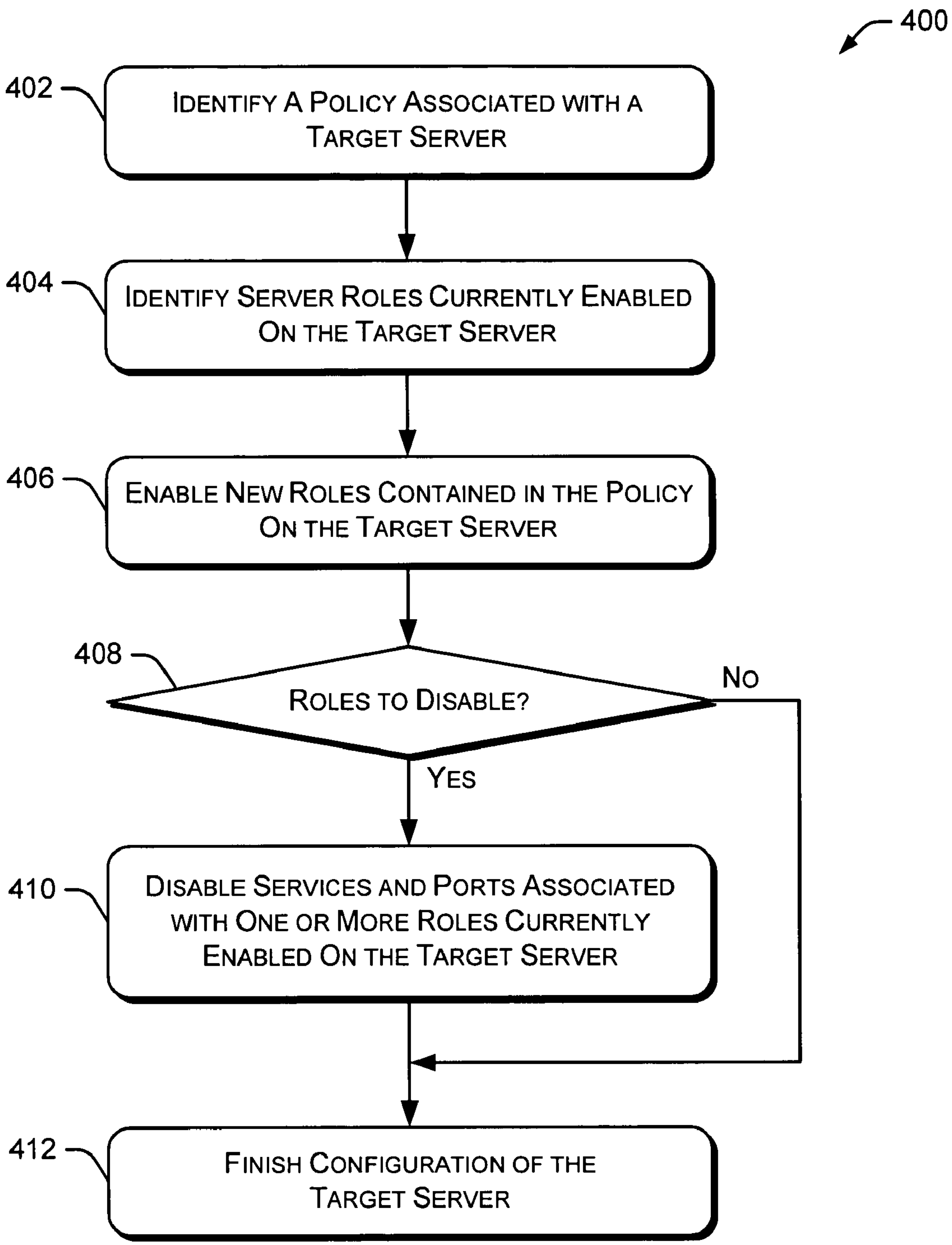
FIG. 4 is a flow diagram illustrating an embodiment of a procedure for configuring a server.

FIG. 4 is a flow diagram illustrating an embodiment of a procedure 400 for configuring a server. Initially, procedure 400 identifies a policy associated with a target server (block 402). The identified policy includes one or more roles that the target server is to perform. Additionally, the identified policy may include one or more roles that the target server is not to perform. Other policies may include one or more roles that the target server is to perform in addition to any roles currently enabled on the target server.

The procedure continues by identifying one or more server roles currently enabled on the target server (block 404). A particular target server may have previously been acting as a server and, therefore, has certain server roles enabled. Procedure 400 enables the new roles contained in the policy on the target server (block 406). The procedure then determines whether any of the currently enabled roles on the target server should be disabled (block 408). This determination is based on information contained in the policy associated with the target server, such as "disable all other server roles" or "disable any file server or web server roles". If one or more roles on the target server need to be disabled, the services and ports associated with those roles are disabled at block 410. Finally, the procedure finishes configuration of the target server (block 412).

FIG. 5 illustrates an example of a Runtime XML file 500 generated by pre-processor 102. For the Runtime XML file 500, the pre-processor sets the <satisfiable> element and the <selected> element for each role. "Satisfiability" is determined by whether or not the target system (e.g., the target server) has all the required services for the corresponding role. "Selected" determines the default selections with which each user begins. The pre-processor can also provide role-independent information such as the IP addresses associated with the target system and the OS version of the target system.

Figure 6:
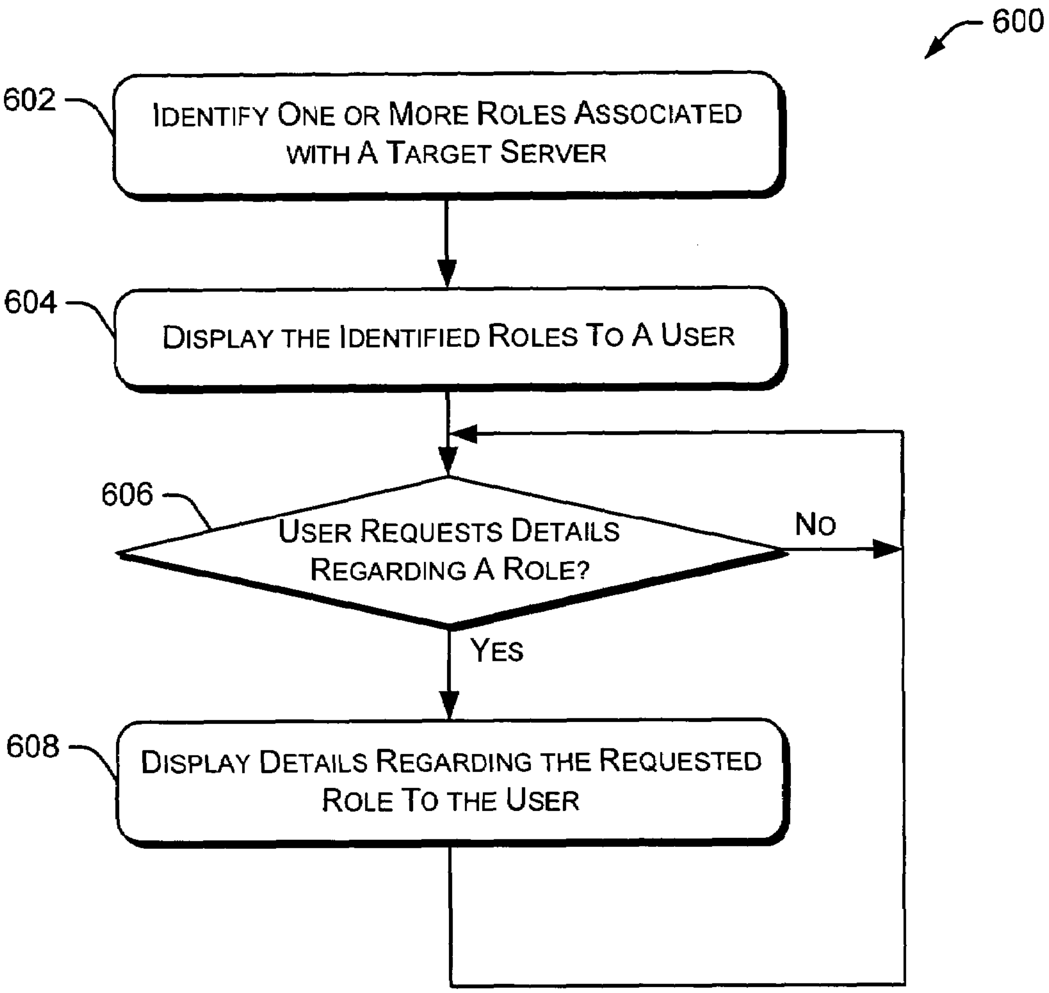
FIG. 6 is a flow diagram illustrating an embodiment of a procedure for masking role details from a user unless a user requests to see the role details.
Figure 7:
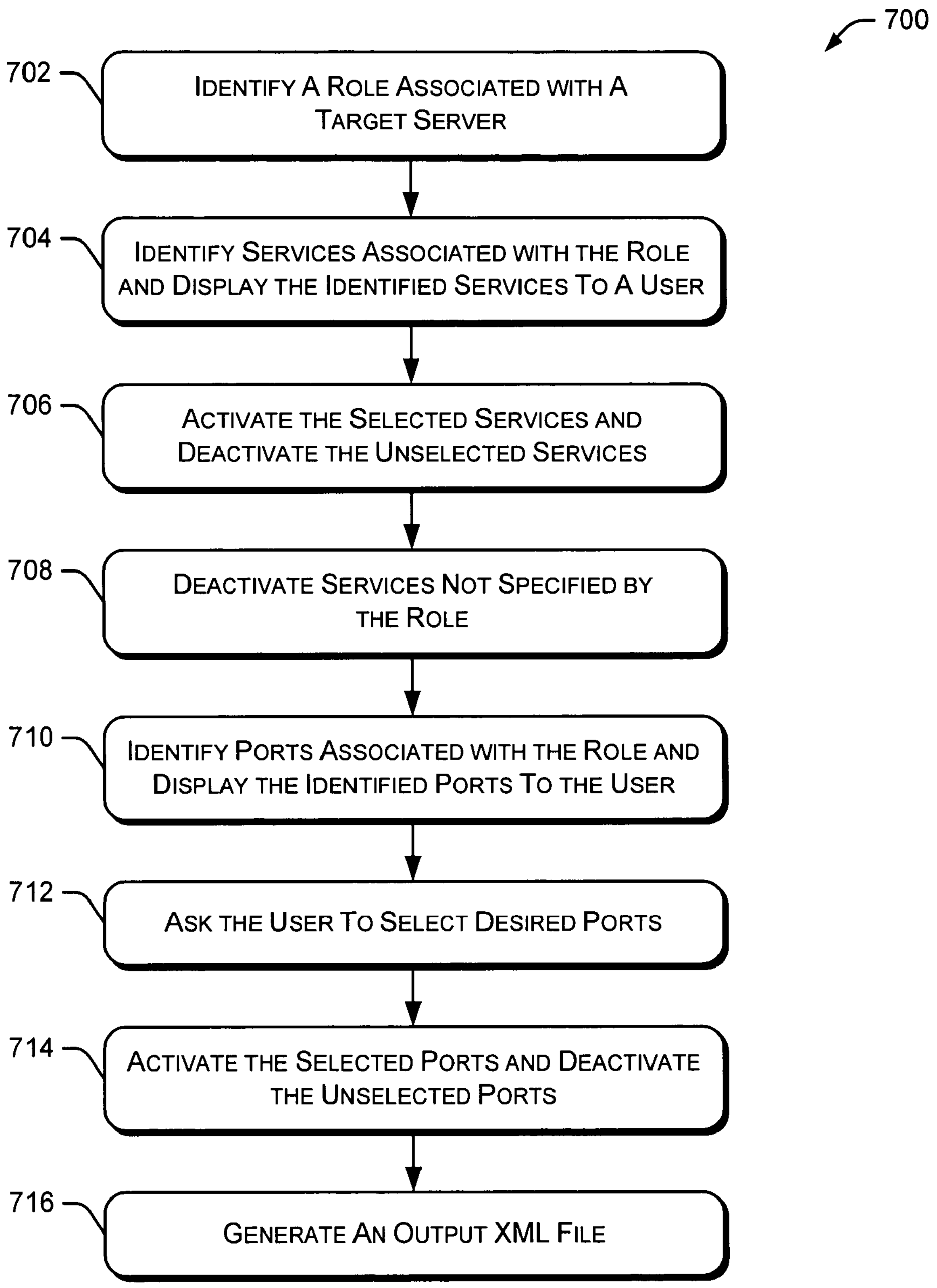
FIG. 7 is a flow diagram illustrating an embodiment of a procedure for allowing a user to select services and ports associated with a particular role.
Figure 8:
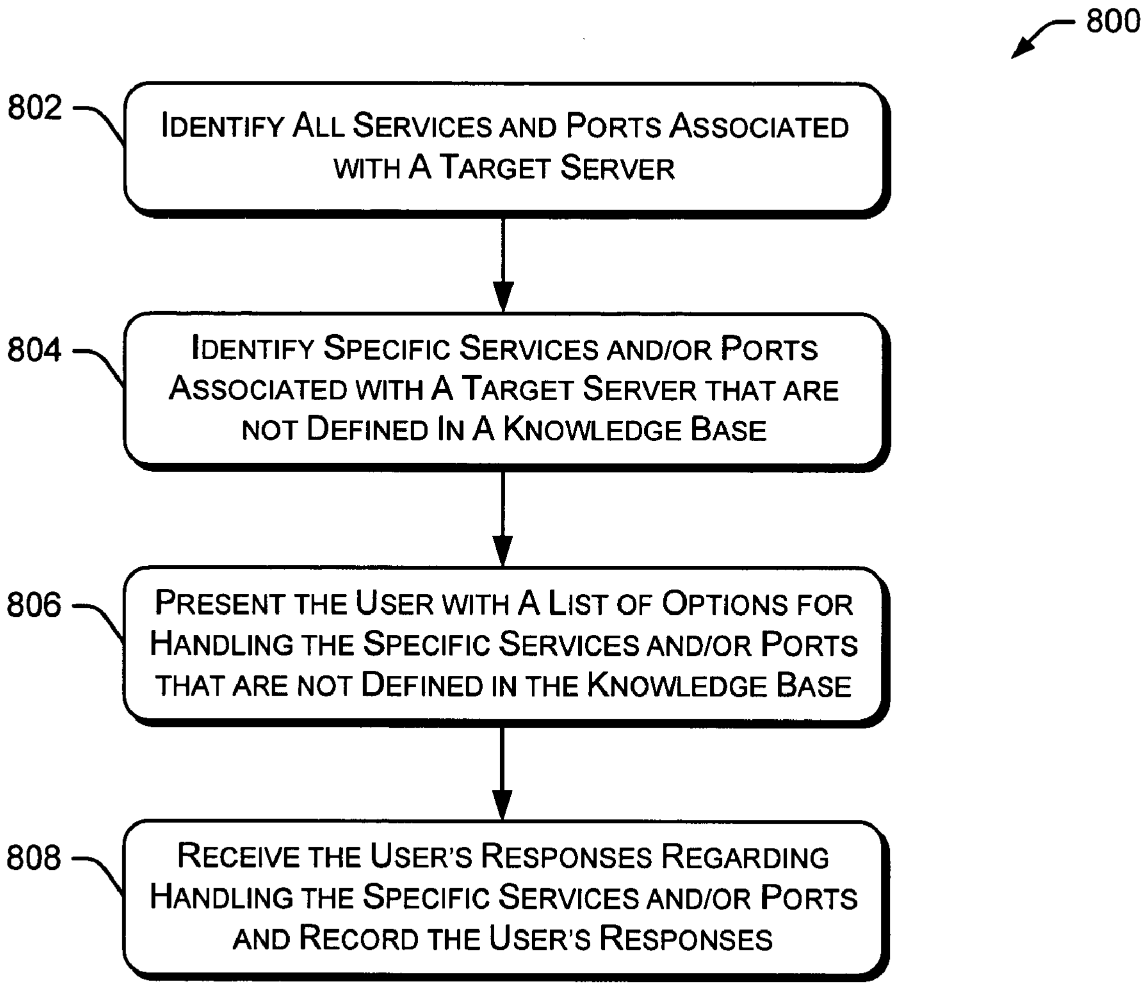
FIG. 8 is a flow diagram illustrating an embodiment of a procedure for determining how to handle services and/or ports associated with a target server that are not defined in a knowledge base.

The procedures discussed below with respect to FIGS. 6, 7 and 8 are examples of procedures that may be performed by user interface application 110 (FIG. 1) using information contained in Runtime XML 108.

FIG. 6 is a flow diagram illustrating an embodiment of a procedure 600 for masking role details from a user unless a user requests to see the role details. Initially, procedure 600 identifies one or more roles associated with a target server (block 602). For example, these roles may be identified in a Runtime XML file received by the user interface application. The procedure then displays a list of the identified roles to the user (block 604). This listing may include the name of the target server (if any) and the roles that are associated with the target server. At this point, the procedure masks (e.g., does not display) details regarding each of the roles associated with the target server. The user may request details regarding one or more of the listed roles (block 606). For example, the user may use a mouse or other pointing device to select a particular role from the list of roles.

If the user requests details regarding a role, the procedure displays details regarding the requested role (block 608). The retrieved details are displayed to the user in the proximity of the associated role. Example details regarding a role include a description of the functions performed by the role, dependencies on other roles, services needed for the role to operate properly, the proper startup mode for such services (automatic or manual), ports needed for the role to operate properly, and the communication direction (inbound or outbound) for such ports.

In a particular embodiment, roles that are not relevant to the target server are, by default, not presented to the user. However, those roles can be added by the user, if desired. If a particular task depends on a role, that task is not displayed to the user unless the corresponding role is selected. For example, if TaskA depends on RoleA, the system will not display TaskA to the user unless RoleA is selected. In various situations, a role may be dependent on another role and a service may be dependent on another service. In any of these situations, if a user selects or deselects a particular role or service, the dependent role or service is also selected or deselected.

In an alternate embodiment, a procedure retrieves all details regarding roles, tasks, services and ports for a particular server. However, only certain details are shown to the user, unless the user requests to see additional details. The particular details shown to the user are based on one or more roles selected by the user.

FIG. 7 is a flow diagram illustrating an embodiment of a procedure 700 for allowing a user to select services and ports associated with a particular role. Initially, procedure 700 identifies a role associated with a target server (block 702). The procedure then identifies services associated with the role and displays the identified services to the user (block 704). Since the procedure knows the role associated with the target server, the list of services is limited to those that are associated with the role, thereby focusing the list of services to those that are relevant to the target server. Next, the selected services (i.e., services associated with the role) are activated and the unselected services (i.e., services that are not associated with the role) are deactivated (block 706). This "activation" and "deactivation" of services will be identified in the Output XML file generated by the user interface application, as discussed below. Further, the procedure deactivates services not specified by the role (block 708).

Procedure 700 continues by identifying ports associated with the role (i.e., the role identified in block 702) and displaying the identified ports to the user (block 710). Since the procedure knows the role associated with the target server, the list of ports is limited to those that are associated with the role, thereby focusing the list of ports to those that are relevant to the target server. In a particular embodiment, block 710 is performed if the user has selected IPSec filtering. The user is then asked to select one or more desired ports from among the listed ports (block 712). This allows the user to make the final selection regarding the ports that will be utilized on the target server. After the user has selected one or more ports from the list of ports, the selected ports are activated and the unselected ports are deactivated (block 714). Finally, an Output XML file is created (block 716) that contains information used by the configuration engine to configure the target server. Information contained in the Output XML file includes data regarding activated and deactivated services and ports.

The end result of the various selections made in FIG. 7 is the definition of a data packet filtering policy for the target server. By selecting available ports and services, the user has effectively defined what types of data will be accepted by the target server and what types of data will be rejected by the target server. Additionally, by specifying exemptions to the packet filtering policy, the user can effectively define what data sources will be permitted to communicate with the target server and what data sources will not be permitted to communicate with the target server.

Although the procedure shown in FIG. 7 specifically discusses services and ports associated with a particular role, various other information can be made available to the user for selection in configuring the target server. For example, a user can filter data based on its source or destination address. Additionally, a user can select one set of ports to allow on one interface and another set of ports to allow on another interface. A user may also specify that traffic with certain machines must be secured using encryption or integrity algorithms and may specify that this traffic is exempt from previously established packet filtering policies. Other information may be solicited from the user, such as communication requirements for downlevel clients and audit objectives in order to determine appropriate settings for security-relevant registry values as well as audit policies.

FIG. 8 is a flow diagram illustrating an embodiment of a procedure 800 for determining how to handle services and/or ports associated with a target server that are not defined in a knowledge base. Initially, procedure 800 identifies all services and ports associated with a target server (block 802). The procedure then identifies specific services and/or ports associated with a target server that are not defined in a knowledge base (block 804). For example, a particular service or port on the target server does not have a corresponding entry in the knowledge base defining the service or port. In this situation, neither the pre-processor nor the user interface application has any knowledge of how the service or port operates or when the service or port is needed.

The user is presented with a list of options for handling the specific services and/or ports that are not defined in the knowledge base (block 806). The options may include deactivating the services and/or ports or defining the operation of the services and/or ports. The procedure receives the user's responses regarding handling the specific services and/or ports and records the user's responses (block 808). These responses are used by the user interface application when generating the Output XML file.

Certain details regarding the configuration of the target server may not be contained in the knowledge base or known to the user configuring the target server. For example, a user may not know the addresses of the target server's domain controllers or DNS servers. However, these addresses can be determined (e.g., from the active directory and the DNS servers) at the time the target server is configured. Thus, the necessary information is obtained and set when the target server is actually configured. Therefore, it is not necessary to have all details regarding a target server until the target server is ready to be configured. This allows the same abstract policy to be delivered and interpreted differently on different machines.

In one embodiment, Internet Protocol Security (IPSec) is used by the systems and methods discussed herein to assist in configuring the target server. IPSec is a set of protocols that support secure exchange of data (e.g., data packets) at the IP layer. Alternate embodiments may use other security protocols, such as ICF (Internet Connection Firewall) or TCP/IP filters.

In a particular embodiment, certain ports and or services may not be contained in the knowledge base. In this situation, the pre-processor (e.g., pre-processor 102 in FIG. 1) is responsible for populating the <Ports> section of the <Unknown><Services><Service> section with any ports that an unknown service is listening on. For example:

```
<Unknown>
<Services>
    <Service>
      <Name> </Name>
      ...
      <Ports>
        <Port>
          <Name> </Name>
          <Type> </Type>
        </Port>
      </Ports>
    </Service>
  </Services>
</Unknown>
```

This capability for the pre-processor uses a remotable interface (referred to as "ActiveSocket") to populate the <Ports> associated with an unknown service as follows:

```
If ActiveSocket( ) call fails, then
    Leave <Ports> section empty
Else {ActiveSocket was called and returned successfully}
If Service was unambiguously found to be listening on a port then:
    If port number is already defined in the KB (under
\<Ports><Port><Number>)then
        <Unknown>...<Ports><Port><Name> = existing
\<Ports><Port><Name>
        Else {port was not found in the KB}
        If port < 1024, then
        //Update the Unknown Service Information
            <Unknown>...<Ports><Port><Name> = Port#
        service was listening on
            <Unknown>...<Ports><Port><Type> =
        Inbound
        //Update the port definition section
            \<Ports><Port><Name> = Port# service was
        listening on
            \<Ports><Port><Number> = Port# service was
        listening on
            \<Ports><Port><Protocols><Protocol><Name>
        = TCP, UDP or Both
        //Update the port localization section
            Set ServiceName = the
        \<ServiceLocalization><Service><DisplayName>
        associated with <Unknown>...<Service><Name>
            \<PortLocalization><Port><Name> = Port#
        service was listening on.
            \<PortLocalization><Port><Type> = Inbound
            \<PortLocalization><Port><DisplayName> =
        %ServiceName%
            \<PortLocalization><Port><Name><Description
        > = SCW determined that the %ServiceName%
        service was listening on port
        %\<Ports><Port><Number>%.
        Else {port is >= 1024}
            <Unknown>...<Ports><Port><Name> =
        RANDOM
            <Unknown>...<Ports><Port><Type> =
```

-continued

```
        Inbound
        Endif
      Endif
    Else {Service was not found to be listening exclusively on a port}
      Leave <Ports> section empty
    Endif
  Endif
```

Thus, the pre-processor dynamically extends the knowledge base and provides this extra target server information to the User interface via the runtime XML. In a particular embodiment, if a service belongs to a process that is hosting other services, then the system does not determine who is listening to what and the system does not make any assumptions in this regard. The process is not concerned with loopback address 127.0.0.1, and treats all UDP ports as "listening" (as long as they are not on the loopback address). TCP ports that are in the listening state are treated as "listening".

A sequence of "pages" or requests for information may be displayed on a display device viewed by the user configuring one or more servers. This sequence of pages request that the user identify functional and deployment requirements, based on the knowledge base data and current disposition of the target server, in order to configure the server. The information requested by the user (i.e., the information contained on the pages) may vary depending on the user's previous selections and information contained in the knowledge base. Examples of the various pages that may be used to collect information from the user are provided below.

Select Server Roles—allows the user to select one or more server roles that the target server will perform, such as DNS Server, File Server, etc.

Select Client Roles—allows the user to select one or more client roles, such as DHCP Client or DNS Client.

Select Server Tasks—allows the user to select one or more tasks that are to be performed by the server, such as collecting performance data, browsing the network for computers and collecting help and support data.

Select Additional Services—allows the user to enable additional services, such as 3rd Party Anti-virus or Backup services.

Handling Unspecified Services—allows the user to select, for example, between 1) don't change services that are not specified by this policy, and 2) disable services that are not specified by this policy.

Configuring IP Security—allows the user to select whether they want to activate the IP Security policy.

IP Security Usage—allows the user to select how they want to use IP Security, such as securing network traffic with trusted computers or blocking specific types of network traffic.

Packet Filtering Strategy—allows the user to select the basic packet filtering strategy, such as filtering traffic over specific local interfaces or filtering traffic from specific computers or subnets.

Open Ports—allows the user to select inbound or outbound ports to open in order to allow network traffic, such as Port 20 (FTP-Data) and Port 80 (Web). Since outbound requests normally require an inbound response, the system and methods described herein automatically establish appropriate inbound block filters to mitigate security holes created by allowing the inbound responses.

Allowing Traffic with Trusted Computers and Subnets—allows the user to select trusted computers and subnets as exemptions to a previously established packet filtering policy. Trusted computers can be explicitly identified (e.g. by address) or implicitly identified (e.g. "Domain Controllers").

Filter Traffic with Untrusted Computers and Subnets—allows the user to filter traffic with specific remote computers or subnets.

Authentication Methods—allows the user to indicate how to establish trust between computers, such as kerberos, certificates or a pre-shared key.

IP Security Summary—allows the user to review IP Security settings.

Configuring Registry Settings—allows the user to select whether they want to activate a registry setting policy.

Require SMB Security Signatures—allows the user to indicate whether Server Message Block (SMB) security signatures are enabled or required.

Require LDAP Signing—allows the user to determine whether LDAP signing is required.

Outbound Authentication Methods—allows the user to determine the LAN Manager authentication level used when making outbound connections.

Outbound Authentication using Domain Accounts—allows the user to provide information about the domain controllers that contain the domain accounts used to connect to other computers.

Outbound Authentication using Local Accounts—allows the user to provide information about the target computer(s).

Inbound Authentication Methods—allows the user to provide information about client computer(s) that connect to the target server or to the domain.

Registry Settings Summary—allows the user to review various registry settings.

The above pages are provided for purposes of explanation. A particular system may include all or a portion of the pages discussed above. Alternatively, a particular system may include pages in addition to those discussed above. The content of certain pages (e.g., the selections offered to the user) may vary based on selections on other pages, information contained in one or more knowledge bases, information regarding the target server(s), etc.

FIGS. 9A and 9B illustrate an example of an Output XML file 900 associated with one or more servers. "Service Names" are the services that make up a particular role. For example, a Web Server Role needs the HTTPfilter, IISAdmin, and W3SVC services. In the example of FIGS. 9A and 9B, only a few Service Names are shown. A particular Output XML file may include any number of Service Names.

Based on the roles that are selected, the corresponding Service Names are enabled and the remaining services are disabled, thereby improving the security of the system. Since each active service provides a potential area for security failures, reducing the number of active services enhances security. "Extension IDs" inform the configuration engine what extension understands the data contained therein. For example, IPSec data can be passed to the IPSec extension for processing. "Filters" define the interface on which the packet filtering process will be implemented. "Port exemptions" and "Dynamic exemptions" identify the traffic that is allowed through the associated filter.

The following is an example of a transformed version of the Output XML file. This transformed version is generated by transformation module 118 and applied to a target server.

```
ipsec
static
set store location=local
delete rule all "SCW Policy"
delete policy name="SCW Policy"
delete filteraction name="$SCW$_Block"
```

delete filteraction name="$SCW$_Permit"

delete filteraction name="$SCW$_Require-Hi"

delete filteraction name="$SCW$_Require-Lo"

delete filteraction name="$SCW$_Request-Hi"

delete filteraction name="$SCW$_Request-Lo"

delete filterlist name="$SCW$_DefaultDeny"

delete filterlist name="$SCW$_InboundPortExemptions"

delete filterlist name="$SCW$_OutboundPortExemptions"

delete filterlist name="$SCW$_InboundAttackVector"

delete filterlist name="$SCW$_MachineExemptions"

delete filterlist name="$SCW$_TrustedGroup1"

delete filterlist name="$SCW$_TrustedGroup2"

delete filterlist name="$SCW$_TrustedGroup3"

delete filterlist name="$SCW$_TrustedGroup4"

delete filterlist name="$SCW$_DynamicExemptions"

delete filterlist name="$SCW$_ProtocolExemptions"

add policy name="SCW Policy" description="Security Configuration Wizard Policy" activatedefaultrule=no assign=no add filteraction name="$SCW$_Block" description="Discard" action=block add filteraction name="$SCW$_Permit" description="Pass without modification or security" action=permit add filteraction name="$SCW$_Require-Hi" description="Negotiate, No Fallback, No Inpass" inpass=no soft=No action=negotiate qmsec="AH[SHA1]+ESP[None, SHA1] AH[MD5]+ESP[None,SHA1] AH[SHA1]+ESP [None,MD5] AH[MD5]+ESP[None,MD5] ESP[None, SHA1] ESP[None,MD5] AH[SHA1] AH[MD5]"

add filteraction name="$SCW$_Require-Lo" description="Negotiate, No Fallback, Inpass" inpass=yes soft=No action=negotiate qmsec="AH[SHA1]+ESP[None, SHA1] AH[MD5]+ESP[None,SHA1] AH[SHA1]+ESP [None,MD5] AH[MD5]+ESP[None,MD5] ESP[None, SHA1] ESP[None,MD5] AH[SHA1] AH[MD5]"

add filteraction name="$SCW$_Request-Hi" description="Negotiate, Fallback, No Inpass" inpass=no soft=Yes action=negotiate qmsec="AH[SHA1]+ESP[None, SHA1] AH[MD5]+ESP[None,SHA1] AH[SHA1]+ESP [None,MD5] AH[MD5]+ESP[None,MD5] ESP[None, SHA1] ESP[None,MD5] AH[SHA1] AH[MD5]"

add filteraction name="$SCW$_Request-Lo" description="Negotiate, Fallback, Inpass" inpass=yes soft=Yes action=negotiate qmsec="AH[SHA1]+ESP[None, SHA1] AH[MD5]+ESP[None,SHA1] AH[SHA1]+ESP [None,MD5] AH[MD5]+ESP[None,MD5] ESP[None, SHA1] ESP[None,MD5] AH[SHA1] AH[MD5]"

add filterlist name="$SCW$_DefaultDeny" description="Traffic to be blocked"

add filterlist name="$SCW$_InboundPortExemptions" description=="Ports to permit (Inbound)"

add filterlist name="$SCW$_OutboundPortExemptions"

description="Ports to permit (Outbound)"

add filterlist name="$SCW$_InboundAttackVector" description="Mitigate holes opened by outbound communication requirement"

add filterlist name="$SCW$_MachineExemptions" description="Machines or Subnets to Permit"

add filterlist name="$SCW$_TrustedGroup 1" description="Machines or Subnets to Require Security with Hi"

add filterlist name="$SCW$_TrustedGroup2" description="Machines or Subnets to Require Security with Lo"

add filterlist name="$SCW$_TrustedGroup3" description="Machines or Subnets to Request Security with Hi"

add filterlist name="$SCW$_TrustedGroup4" description="Machines or Subnets to Request Security with Lo"

add filterlist name="$SCW$_DynamicExemptions" description="Infrastructure Traffic"

add filterlist name="$SCW$_ProtocolExemptions" description="IP Protocols to Permit"

add filter filterlist="$SCW$_DefaultDeny" dstaddr=157.59.132.0 srcaddr=any description="any to me/IP" protocol=ANY mirrored=yes srcmask=255.255.255.255 dstmask=255.255.252.0 add filter filterlist="$SCW$_InboundPortExemptions" dstaddr=157.59.132.0 srcaddr=any description="any to me/IP" protocol=TCP mirrored=yes srcmask=255.255.255.255 dstmask=255.255.252.0 dstport=80 srcport=0 add filter filterlist="$SCW$_InboundPortExemptions" dstaddr=157.59.132.0 srcaddr=any description="any to me/IP" protocol=TCP mirrored=yes srcmask=255.255.255.255 dstmask=255.255.252.0 dstport=443 srcport=0 add filter filterlist="$SCW$_ProtocolExemptions" dstaddr=me srcaddr=any description="Protocol filter" protocol=ICMP mirrored=yes srcmask=255.255.255.255 dstmask=255.255.255.255 add rule name="$SCW$_Block_DefaultDeny" policy="SCW Policy" filterlist=_"$SCW$_DefaultDeny" filteraction="$SCW$_Block" activate=yes add rule name="$SCW$_Permit_InboundPortExemptions" policy="SCW Policy" filterlist="$SCW$_InboundPortExemptions" filteraction="$SCW$_Permit" activate=yes add rule name="$SCW$_Permit_OutboundPortExemptions" policy="SCW Policy" filterlist="$SCW$_OutboundPortExemptions" filteraction="$SCW$_Permit" activate=yes add rule name="$SCW$_MitigateInboundAttackVector" policy="SCW Policy" filterlist="$SCW$_InboundAttackVector" filteraction="$SCW$_Block" activate=yes add rule name="$SCW$_Permit_MachineExemptions" policy="SCW Policy" filterlist="$SCW$_MachineExemptions" filteraction="$SCW$_Permit" activate=yes add rule name="$SCW$ Require-Hi_TrustedGroup1" policy="SCW Policy" filterlist="$SCW$_TrustedGroup1" filteraction="$SCW$_Require-Hi" activate=yes kerberos=Yes add rule name="$SCW$_Require-Lo_TrustedGroup2" policy="SCW Policy" filterlist="$SCW$_TrustedGroup2" filteraction="$SCW$_Require-Lo" activate=yes kerberos=Yes add rule name="$SCW$_Request-Hi_TrustedGroup3" policy="SCW Policy" filterlist="$SCW$_TrustedGroup3" filteraction="$SCW$_Request-Hi" activate=yes kerberos=Yes add rule name="$SCW$_Request-Lo_TrustedGroup4" policy="SCW Policy" filterlist="$SCW$_TrustedGroup4" filteraction="$SCW$_Request-Lo" activate=yes kerberos=Yes add rule name="$SCW$_Permit_DynamicExemptions" policy="SCW Policy"

```
filterlist="$SCW$_DynamicExemptions"
filteraction="$SCW$_Permit" activate=yes
  add rule name="$SCW$_Permit_ProtocolExemptions"
policy="SCW Policy"
filterlist="$SCW$_ProtocolExemptions"
filteraction="$SCW$_Permit" activate=yes
  set policy name="SCW Policy" assign=y
```

The above transformed version of the Output XML file contains various settings and other information used to configure the target server. An IPSec filter describes a subset of network traffic in terms of five parameters: SA (Source Address), DA (Destination Address), SP (Source Port), DP (Destination Port), and Protocol. A Filter List includes one or more such filters that may describe a larger subset of traffic that can trigger a specific filter action, such as Block or Permit. Rules associate filter lists with filter actions.

Figure 10:
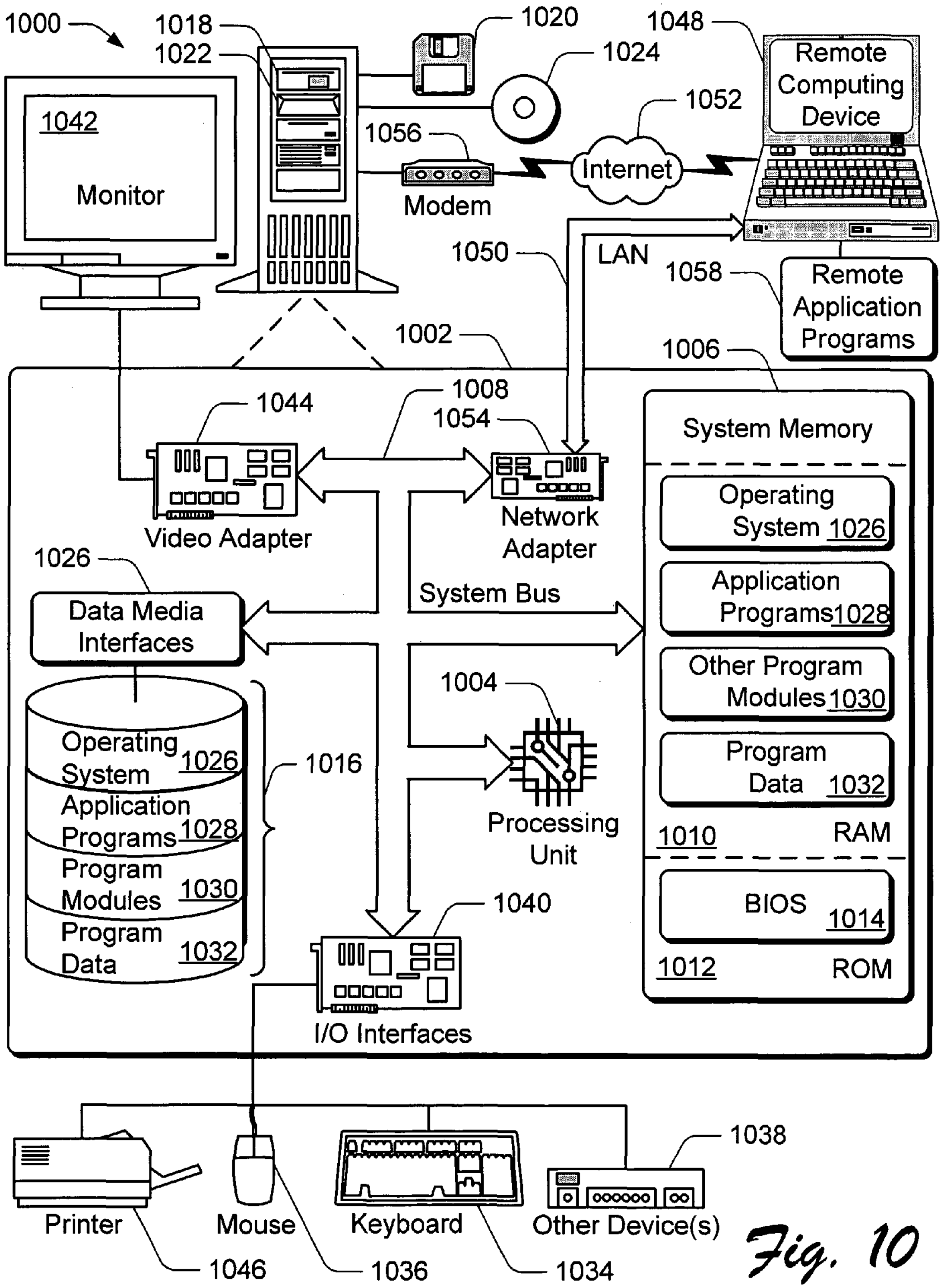
FIG. 10 illustrates an example of a computing environment.

FIG. 10 illustrates an example of a computing environment 1000 within which the server configuration systems and methods, can be either fully or partially implemented. Computing environment 1000 is only one example of a computing system and is not intended to suggest any limitation as to the scope of use or functionality of the network architectures. Neither should the computing environment 1000 be interpreted as having any dependency or requirement relating to any one or combination of components illustrated in the example computing environment 1000.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The computing environment 1000 includes a general-purpose computing system in the form of a computing device 1002. The components of computing device 1002 can include, but are not limited to, one or more processors 1004 (e.g., any of microprocessors, controllers, and the like), a system memory 1006, and a system bus 1008 that couples various system components including the processor 1004 to the system memory 1006. The one or more processors 1004 process various computer-executable instructions to control the operation of computing device 1002 and to communicate with other electronic and computing devices.

The system bus 1008 represents any number of several types of bus or switching structures, including a memory bus or memory controller, point-to-point connections, a switching fabric, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computing environment 1000 typically includes a variety of computer-readable media. Such media can be any available media that is accessible by computing device 1002 and includes both volatile and non-volatile media, removable and non-removable media. The system memory 1006 includes computer-readable media in the form of volatile memory, such as random access memory (RAM) 1010, and/or non-volatile memory, such as read only memory (ROM) 1012. A basic input/output system (BIOS) 1014, containing the basic routines that help to transfer information between elements within computing device 1002, such as during start-up, is stored in ROM 1012. RAM 1010 typically contains data and/or program modules that are immediately accessible to and/or presently operated on by the processing unit 1004.

Computing device 1002 can also include other removable/non-removable, volatile/non-volatile computer storage media. By way of example, a hard disk drive 1016 is included for reading from and writing to a non-removable, non-volatile magnetic media (not shown), a magnetic disk drive 1018 for reading from and writing to a removable, non-volatile magnetic disk 1020 (e.g., a "floppy disk"), and an optical disk drive 1022 for reading from and/or writing to a removable, non-volatile optical disk 1024 such as a CD-ROM, DVD, or any other type of optical media. The hard disk drive 1016, magnetic disk drive 1018, and optical disk drive 1022 are each connected to the system bus 1008 by one or more data media interfaces 1026. Alternatively, the hard disk drive 1016, magnetic disk drive 1018, and optical disk drive 1022 can be connected to the system bus 1008 by a SCSI interface (not shown).

The disk drives and their associated computer-readable media provide non-volatile storage of computer-readable instructions, data structures, program modules, and other data for computing device 1002. Although the example illustrates a hard disk 1016, a removable magnetic disk 1020, and a removable optical disk 1024, it is to be appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on the hard disk 1016, magnetic disk 1020, optical disk 1024, ROM 1012, and/or RAM 1010, including by way of example, an operating system 1026, one or more application programs 1028, other program modules 1030, and program data 1032. Each of such operating system 1026, one or more application programs 1028, other program modules 1030, and program data 1032 (or some combination thereof) may include an embodiment of the systems and methods for a test instantiation system.

Computing device 1002 can include a variety of computer-readable media identified as communication media. Communication media typically embodies computer-readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

A user can enter commands and information into computing device 1002 via input devices such as a keyboard 1034 and a pointing device 1036 (e.g., a "mouse"). Other input devices 1038 (not shown specifically) may include a microphone, joystick, game pad, controller, satellite dish, serial port, scanner, and/or the like. These and other input devices are connected to the processing unit 1004 via input/output interfaces 1040 that are coupled to the system bus 1008, but may be connected by other interface and bus structures, such as a parallel port, game port, and/or a universal serial bus (USB).

A monitor 1042 or other type of display device can also be connected to the system bus 1008 via an interface, such as a video adapter 1044. In addition to the monitor 1042, other output peripheral devices can include components such as speakers (not shown) and a printer 1046 which can be connected to computing device 1002 via the input/output interfaces 1040.

Computing device 1002 can operate in a networked environment using logical connections to one or more remote computers, such as a remote computing device 1048. By way of example, the remote computing device 1048 can be a personal computer, portable computer, a server, a router, a network computer, a peer device or other common network node, and the like. The remote computing device 1048 is illustrated as a portable computer that can include many or all of the elements and features described herein relative to computing device 1002.

Logical connections between computing device 1002 and the remote computer 1048 are depicted as a local area network (LAN) 1050 and a general wide area network (WAN) 1052. Such networking environments are commonplace in offices, enterprise-wide computer networks, intranets, and the Internet. When implemented in a LAN networking environment, the computing device 1002 is connected to a local network 1050 via a network interface or adapter 1054. When implemented in a WAN networking environment, the computing device 1002 typically includes a modem 1056 or other means for establishing communications over the wide network 1052. The modem 1056, which can be internal or external to computing device 1002, can be connected to the system bus 1008 via the input/output interfaces 1040 or other appropriate mechanisms. It is to be appreciated that the illustrated network connections are exemplary and that other means of establishing communication link(s) between the computing devices 1002 and 1048 can be employed.

In a networked environment, such as that illustrated with computing environment 1000, program modules depicted relative to the computing device 1002, or portions thereof, may be stored in a remote memory storage device. By way of example, remote application programs 1058 reside on a memory device of remote computing device 1048. For purposes of illustration, application programs and other executable program components, such as the operating system, are illustrated herein as discrete blocks, although it is recognized that such programs and components reside at various times in different storage components of the computer system 1002, and are executed by the data processor(s) of the computer.

Particular examples discussed herein relate to creating a security policy and configuring a server with that security policy. Similar procedures can be used to modify existing security policies, apply an existing security policy to another server, or analyze a server for compliance with a particular security policy.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:

identifying an operating system level of a target server;

determining one or more security levels for the target server based on the identified operating system level of the target server;

selecting one of the one or more security levels for the target server; and identifying at least one role for the target server based on the selected security level;

obtaining a current configuration from the target server, the current configuration including one or more roles that the target server is capable of performing;

assigning one of the one or more roles to the target server that the target server is capable of performing, wherein the assigned one of the one or more roles is also the at least one role identified based on the selected security level;

identifying one or more services associated with the one assigned role;

identifying one or more ports associated with the one assigned role presenting the identified services and ports associated with the one assigned role to a user; and requesting the user to select among the identified ports for activation in the target server.

2. The method of claim 1, wherein the identified services and ports are limited to those that are relevant based on information obtained from a knowledge base.

3. The method of claim 1, wherein the identified services and ports are limited to those that are relevant based on information regarding a target server.

4. The method of claim 1, further comprising activating the selected services and ports.

5. The method of claim 4, wherein at least one of the services associated with the one assigned role and the ports associated with the one assigned role are identified from a knowledge base.

6. The method of claim 1, further comprising deactivating unselected services and ports.

7. The method of claim 1, further comprising generating an output file containing services and ports selected by the user.

8. The method of claim 1, further comprising displaying details regarding the one assigned role in response to a request by the user.

9. The method of claim 1, further comprising displaying a list of options for handling a service associated with the target server that is not defined in a knowledge base.

10. The method of claim 9, further comprising requesting the user to select an option for handling the service.

11. One or more computer-readable memories containing a computer program that is executable by a processor to perform the method claimed in claim 1.

12. A method comprising:

identifying an operating system level of a target server;

determining one or more security levels for the target server based on the identified operating system level of the target server;

selecting one of the one or more security levels for the target server; and identifying at least one role for the target server based on the selected security level;

obtaining a current configuration from a target server, the current configuration including one or more roles that the target sewer is capable of performing;

assigning one of the one or more roles to the target server that the target server is capable of performing, wherein the assigned one of the one or more roles is also the at least one role identified based on the selected security level;

identifying one or more services associated with the one assigned role;

displaying the identified services associated with the one assigned role;

allowing a user to modify the displayed services;

identifying the modified services as active services and identifying unmodified services as inactive services;

generating an output file that includes identities of the active services; and transforming the output file into at least one of one or more native scripts or one or more configuration files for application on the target server.

13. The method of claim 12, wherein identifying services associated with the one assigned role includes retrieving data from a knowledge base.

14. The method of claim 12, further comprising generating an output file containing services modified by the user.

15. The method of claim 12, wherein the user is responsible for configuring the target server.

16. The method of claim 12, wherein the generating an output file includes generating an XML file.

17. One or more computer-readable memories containing a computer program that is executable by a processor to perform the method claimed in claim 12.

18. A method comprising:

identifying an operating system level of a target server;

determining one or more security levels for the target server based on the identified operating system level of the target server;

selecting one of the one or more security levels for the target server; and identifying at least one role for the target server based on the selected security level;

obtaining a current configuration from a target server, the current configuration including one or more roles that the target server is capable of performing;

assigning one of the one or more roles to the target server that the target server is capable of performing, wherein the assigned one of the one or more roles is also the at least one role identified based on the selected security level;

identifying one or more ports associated with the one assigned role;

presenting the identified ports associated with the one assigned role to a user;

requesting the user to select among the identified ports associated with the one assigned role; and identifying the selected ports as active ports and identifying unselected ports as inactive ports;

generating an output file that includes identities of the active services; and transforming the output file into at least one of one or more native scripts or one or more configuration files for application on the target server.

19. The method of claim 18, wherein the generating an output file includes generating an XML file.

20. The method of claim 18, wherein the one or more ports are identified using information contained in a knowledge base.

21. The method of claim 18, further comprising identifying one or more services associated with the one assigned role.

22. The method of claim 21, further comprising:

displaying one or more ports associated with the one assigned role; and requesting the user to select among the one or more ports to activate in the target server.

23. One or more computer-readable memories containing a computer program that is executable by a processor to perform the method claimed in claim 18.

24. An apparatus comprising:

a pre-processor to receive information regarding server roles from a knowledge base and to receive characteristics of a target server, the characteristics including:

an operating system level of the target server;

one or more security levels associated with the operating system level of the target server, one or more roles that the target server is capable of performing, wherein the pre-processor generates a file that includes one of the one or more roles that the target server is capable of performing, the one of the one or more roles being assigned to the target server and identified based on a security level selected from the one or more security levels, and wherein information in the file regarding services and ports associated with the server roles is presented to a user for selection; and a configuration engine coupled to the pre-processor, wherein the configuration engine configures the target server based on the user's selection of services and ports.

25. The apparatus of claim 24, further comprising a user interface application to generate an output file identifying services selected by the user.

26. The apparatus of claim 24, further comprising a user interface application to generate an output file identifying ports selected by the user.

27. The apparatus of claim 25, wherein the configuration engine applies the output file when configuring the target server.

28. The apparatus of claim 26, wherein the configuration engine applies the output file when configuring the target server.

29. One or more computer-readable media having stored thereon a computer program that, when executed by one or more processors, causes the one or more processors to:

identifying an operating system level of a target server;

determining one or more security levels for the target server based on the identified operating system level of the target server;

selecting one of the one or more security levels for the target server; and identifying at least one role for the target server based on the selected security level;

obtaining a current configuration from the target server, the current configuration including one or more roles that the target server is capable of performing;

selecting one of the one or more roles to the target server that the target server is capable of performing, wherein the selected one of the one or more roles is also the at least one role identified based on the selected security level;

identify one or more services associated with the selected role;

identify one or more ports associated with the selected role;

display the identified services and ports associated with the selected role; and receive selected services and ports to be activated on the target server.

30. The one or more computer-readable media of claim 29, wherein the one or more processors further activate the selected services and ports during configuration of the target server.

31. The one or more computer-readable media of claim 29, wherein the one or more processors further deactivate unselected services and ports during configuration of the target server.

32. The one or more computer-readable media of claim 29, wherein the one or more processors further identify the one or more services and the one or more ports associated with the selected role are identified from a knowledge base.

33. The one or more computer-readable media of claim 29, wherein the one or more processors further display one or more options for handling a service associated with the target server that is not defined in a knowledge base.

* * * * *